(12) United States Patent
Kestyn

(10) Patent No.: US 6,508,652 B1
(45) Date of Patent: Jan. 21, 2003

(54) CHEMBLOX EDUCATIONAL MOLECULAR MODELS

(76) Inventor: Paul Edward Kestyn, 35 Congress St., Greenfield, MA (US) 01301

( * ) Notice: Subject to any disclaimer, the term of this patent is extended or adjusted under 35 U.S.C. 154(b) by 0 days.

(21) Appl. No.: 09/173,455

(22) Filed: Oct. 16, 1998

Related U.S. Application Data

(60) Provisional application No. 60/062,290, filed on Oct. 17, 1997.

(51) Int. Cl.$^7$ ............................................. G09B 23/26
(52) U.S. Cl. ..................................................... 434/278
(58) Field of Search .............................. 434/278, 281, 434/279; 446/124, 126, 102; D19/62

(56) References Cited

U.S. PATENT DOCUMENTS

| | | | | |
|---|---|---|---|---|
| 2,308,402 A | * | 1/1943 | Taylor | 434/278 |
| 3,509,642 A | * | 5/1970 | Brumlik | 434/278 |
| 3,510,962 A | * | 5/1970 | Sato | 434/278 |
| 3,604,130 A | * | 9/1971 | Forsstrom | 434/278 |
| 3,841,001 A | * | 10/1974 | Nicholson | 434/278 |
| 3,939,581 A | * | 2/1976 | Clarke | 434/278 |
| 4,020,566 A | * | 5/1977 | Dreidling | 434/278 |
| 4,030,209 A | * | 6/1977 | Dreidling | 434/278 |
| 4,398,888 A | * | 8/1983 | Darling | 434/278 |
| 4,810,197 A | * | 3/1989 | Hicks | 434/278 |
| 4,877,406 A | * | 10/1989 | Wilk | 434/278 |
| 5,030,103 A | * | 7/1991 | Buist | 434/278 |

FOREIGN PATENT DOCUMENTS

GB     1498951     *  1/1978 ................. 434/278

* cited by examiner

*Primary Examiner*—Derris H. Banks
*Assistant Examiner*—Kurt Fernstrom

(57) ABSTRACT

A chemical model set of 15 elements of the first three periods and one generic transitional metal that can easily build and disassemble molecular structures. The models have markings on them to signify their chemical symbol, electronic orbital state and electro-negativity. The models have ceramic magnets in a plastic assembly that is attached to the models. This assembly can move rotationally and laterally about the sides of the model in slots that are individually designated to the models and facilitate the building of molecular structures.

The ceramic magnet assemblies are able to mate at either face of their polarized edge with magnets of facing models, and are marked with an arrow in the direction of their polarity. The rotational ability of the magnet assembly allows the relative oxidative or reductive state of the model in a molecular structure to be surmised by the symbolic placing or removing of electron density on the model in the direction that the paired arrows in the bond are facing. The mutual direction of the arrows, with one arrow facing away from its model in a spin up orientation and the other facing towards the other in a spin-down orientation can thus fulfill the Pauli exclusion principal and also, by virtue of color encoded ends of the magnet, indicate the relative noble character and electron density of the individual elements and resulting attributes. Also, the models can be used to simulate reactions, mechanistic paths and possible products of reacted species.

5 Claims, 4 Drawing Sheets

CHEMBLOX EDUCATIONAL MOLECULAR MODELS

CROSS-REFERENCE

This claim arises out of Provisional Application Ser. No. 60/062,290 on the filing date of Oct. 17, 1997.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This Educational Modeling set is an atomic model set that has individually designed physical models of the elements to use in an easily understood and easily manipulated manner to build interactive molecular structures. This modeling system, uses the concepts of valence electrons and electron orbital configurations to produce abstract models of chemical systems. Earlier this century, adherents to the Lewis-Koss theories of molecules tried to use a similar brand of philosophy to emulate chemical systems, but lacked intrinsic knowledge to succeed.

The Ball and Stick and CPK type models that were used by Nobel laureate Francis Crick and James Watson to construct the then hypothetical DNA molecule, can build three-dimensional models of chemical structures which allows a good visualization of enantiomers, conformers and lattice structures of molecules. Similarly, these two-dimensional models give users a good visual definition of the placement of electron density in molecular structures and the resulting noble character of the oxidized or reduced atoms in the molecule and resulting associated reactivity to other molecules, as well as being simple to build with accurately detailed design. Most importantly, this modeling system creates a physical set of reversible oxidation and reduction pathways between the atoms that produce an understanding of chemical reactions and molecular characteristics in chemical systems.

A previous chemistry modeling system invented by Dreidling mentions the use of magnets, in both of his patents, as attaching mechanisms, but makes no mention of the magnets as being representative of electrons in a bond or reversing of polarity direction to indicate quantum spin of the system or of their use in portraying electron density in his models electron orbital illustrations, such as the Models are shown here to be capable of doing. Other chemistry modeling systems act three-dimensionally in an angular or space-filling correct manner, which these models do not, or are used for different purposes altogether, such as in Hicks atomic model comparing equipment, or in Brumlicks bonding and anti-bonding models, which are good for pi-bonded systems. Hun's English Patent makes some similar arguments that the models here can, but fails when there is other models besides an anion or cation, and does not include the same electron orbital illustrations or the use of valence electrons and two electron bonds that these models incorporate. Also, Huns device could not demonstrate the reductive and oxidative properties of Hydrogen that the Hydrogen models can while in a molecular species, as well as each of the Models ability to show these dual dynamic properties, because Hun's models either take or give a simulated electron charge by its projections and recesses, but do not do both on any one model.

The models described in this disclosure teach about the individual elements and their attributes of valence electrons, two-electron bonds between atoms, electron orbital configuration and its relationship to molecular structures, and the electron's quantum spin, which demonstrates a dipole moment and its involvement in transition states of reactive molecules. All these components add to an increase of awareness of the real Elements, which make up the molecules, and their computer analogs. The ingeniousness of this modeling system is that it uses the spin magnetic moment of the electron evinced through the magnetic field orientation in the magnet and portrayed by an arrow painted onto the magnet in the direction of polarity, which teach through this dynamic quantum effect, about molecular bond attributes, such as paired spin and dipole moments. A physical set of oxidation and reduction pathways between the atoms create an understanding of chemical reactions and help reveal molecular characteristics, such as dipole moment, hydrogen bonding, Van der Waals Forces, electron density, and stoichiometry, to name some, in chemical systems and modeled molecules.

The models are a mnemonic device that can be mentally called on through an individuals career, and may have application in the field of research as well. And, the tactile methods that these models use are an effective way to learn and remember concepts.

The models ubiquitous nature can apply to many areas of chemistry including synthesis, analysis, reaction mechanisms and in physical chemistry and, primarily, as a beginning chemistry teaching device.

BRIEF SUMMARY OF THE INVENTION

The model set is comprised of each element of the first three periods in the Periodic Table of Elements, and a generic Transition Metal Model, that are designed in size and operation to work together manually to recreate all the various bonding schemes of nearly all molecular structures by the use of the represented bonding valence electron pieces, with illustrated electron spin direction, that are attached to an atomic element base which have illustrations and nomenclature of the electronic orbital state, its electronegativity number, as well as the name of the Element. Polycyclic and complex molecules might be difficult to simulate with these models. The bonding valence shell electron piece is represented by a ceramic magnet assembly that has been attached to the model and allow the model to be physically bonded together with another model by the magnets aligned polarities. The valence electron piece magnets have an arrow illustration that points in a South to North polarity direction, and thus pair up when joined in a molecular orbital with an opposing model, to allow visual accounting about oxidation and reduction of illustrated orbitals as well as to physically demonstrate The Pauli Exclusion Principal and Molecular Orbital Theory. The two magnets in a modeled molecular bond orbital fulfill the Pauli Exclusion Principle through the one magnet in a "Spin-Up", away from the one model and the bonded magnet of the other model in a "Spin-Down" towards the other model, thus following the quantum principals of Molecular Orbitals and showing oxidation-reduction within the molecular species through the aligned arrow illustrations on the valence electron pieces. Also illustrated on the ceramic magnets are a red stripe at the back of the arrow, symbolizing oxidation of the atomic nucleus of the model the magnet is pointing away from, and a blue stripe at the tip of the arrow, to symbolize reduction of the atomic nucleus that it is pointing at. In this way accurate structures can be built with the models, while learning the physical attributes of the elements in molecular structures and their corresponding interactions to other molecules.

The physical attributes given to each different element model will be given by color-coded illustration on the surface top of each model. On each of the models its chemical symbol is given and concentric circles will account for the state of the electronic structure of the orbital shells and the degenerate and hybridized orbital configurations for each individual element. Red circles will indicate empty shells or degenerate orbital configurations, and blue circles will indicate filled shells or degenerate orbital configurations. A half red and half blue circle will indicate a half-filled orbital or shell. The orbital circles will also be identified with their quantum nomenclature. The red and blue strip on the "valence electron piece", together with the illustrated arrow, will simulate a filling or emptying of the half-filled orbital illustrations of the models, depending on its direction of attachment.

The models are of a size that allow easy manipulation by a person's hands and consist of a solid, rectangular cube shape with slots cut through them to accommodate the bonding valence electron pieces. The valence electron piece assembly is comprised of a plastic stem, which can be fastened through the slots and secured to the model, and, thereby, allows rotational and lateral movements about the face of the individual element models. On the plastic stem the valence electron piece assembly has a ceramic magnet centered upon the stem, so that it may reach the side of the model to bond with another model's valence electron piece magnet at either of its polarized edges. The valence electron assemblies are used in conjunction with the attributes that are illustrated on each model, in general accordance to the Aufbau Principle and Hund's Rule. Rotation of the valence electron piece assembly insures proper polarity alignments between the bonding magnets of the valence electron piece. An arrow, illustrated in the direction of polarity, and color-coded edges on the magnet of the assemblies will assign reduced and oxidative orbital states within the models. The valence electron piece arrow illustration that points away from its atomic nucleus can be thought of as the higher energy electron, just as a spin-up electron is in nature.

DETAILED DESCRIPTION OF THE INVENTION

Figure 1:
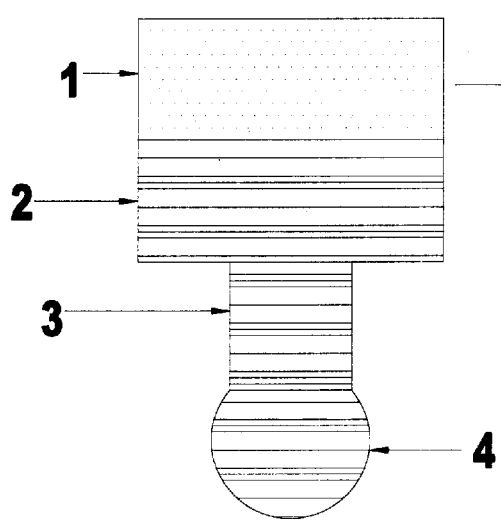
FIG. 1. Shows Valence Electron Piece assembly in front view.
Figure 2:
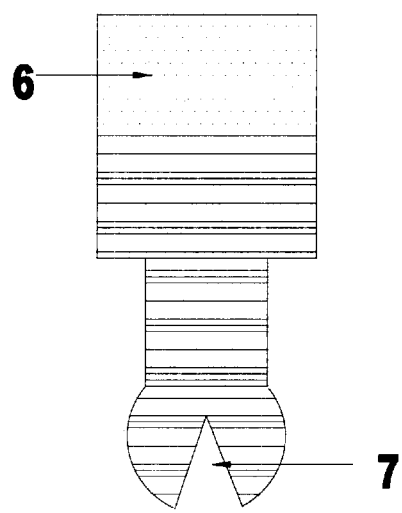
FIG. 2. Shows Valence Electron Piece assembly in side view.
Figure 3:
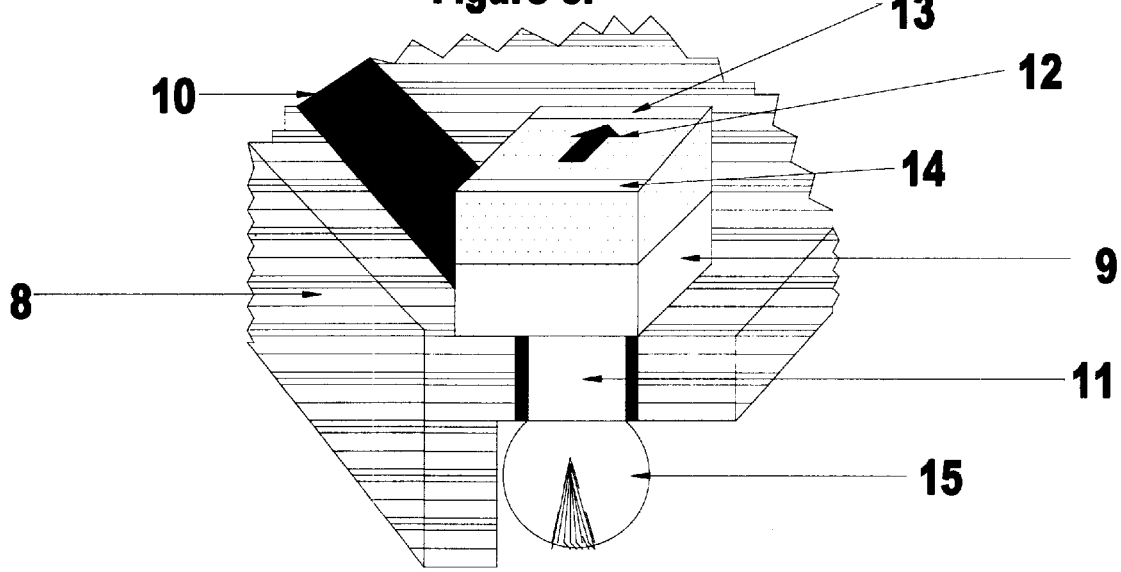
FIG. 3. Shows Valence Electron Piece assembly in the operational mode within the models in a partial sectional view.
Figure 4:
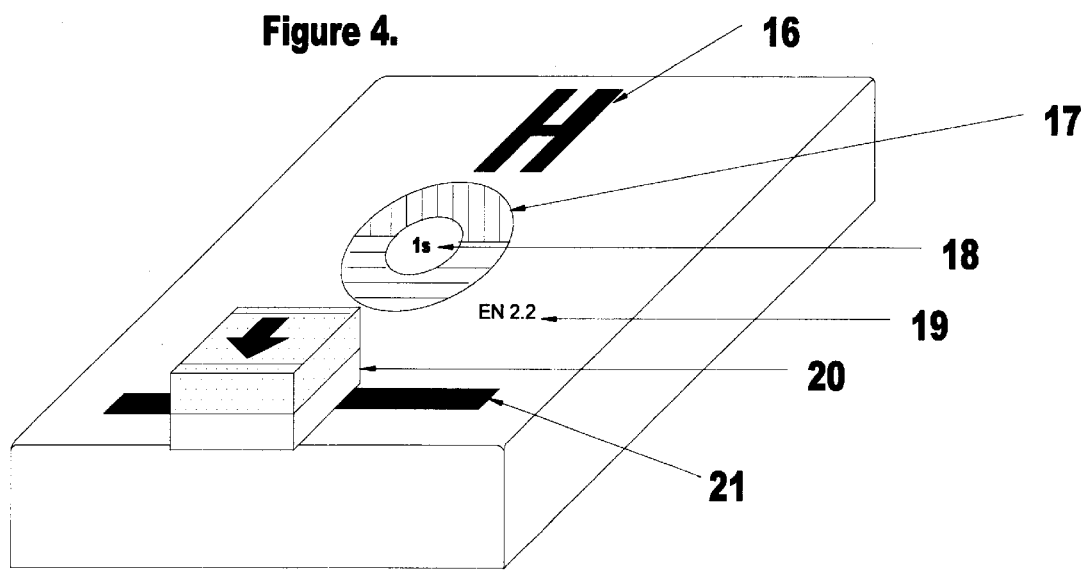
FIG. 4. Shows the general construction of Hydrogen model.
Figure 5:
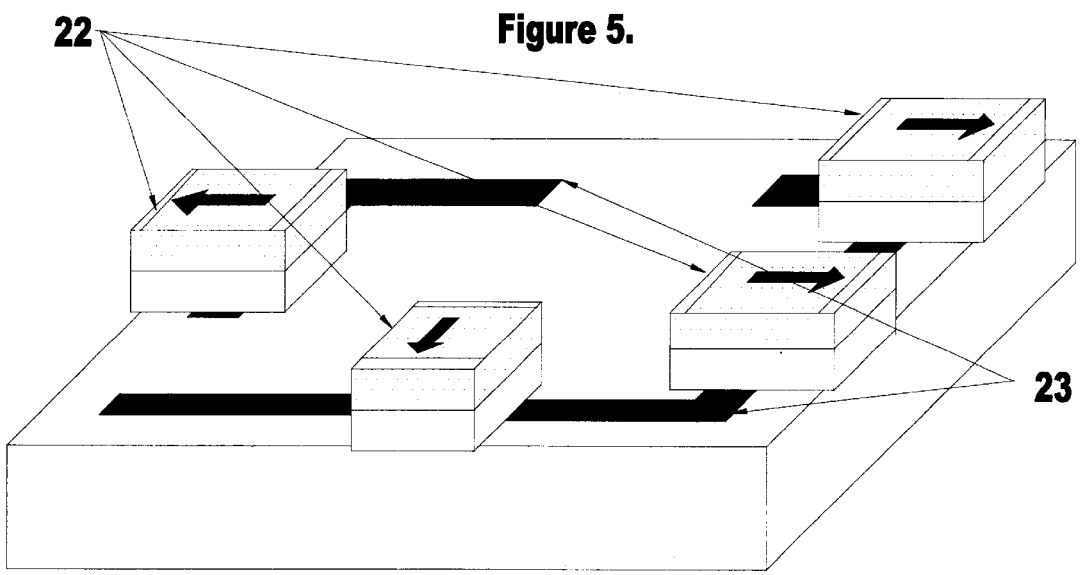
FIG. 5. Shows the Base Construction of Carbon Model.
Figure 6:
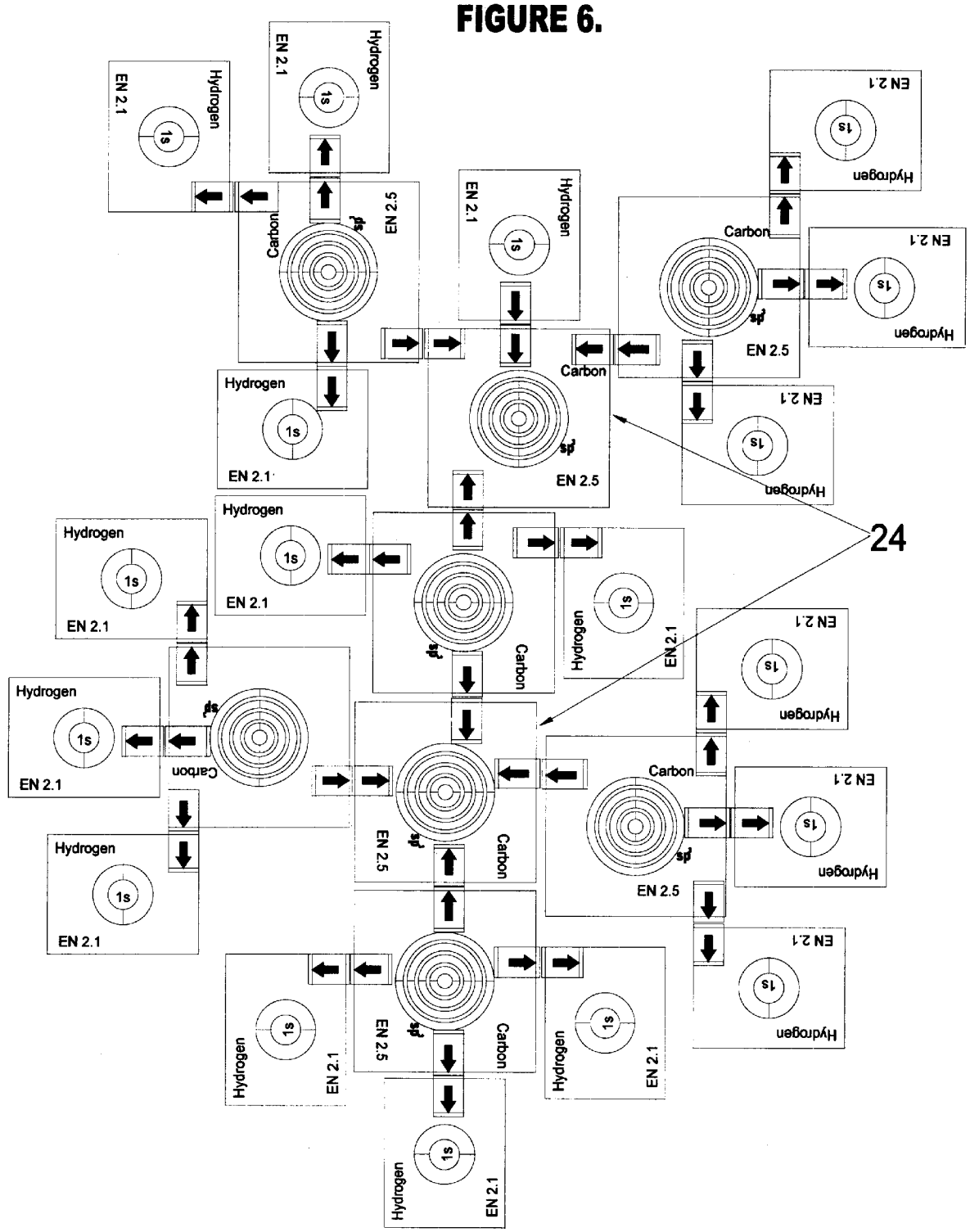
FIG. 6. Shows the Models as used in a model of the Molecule "Iso-Octane."
Figure 7:
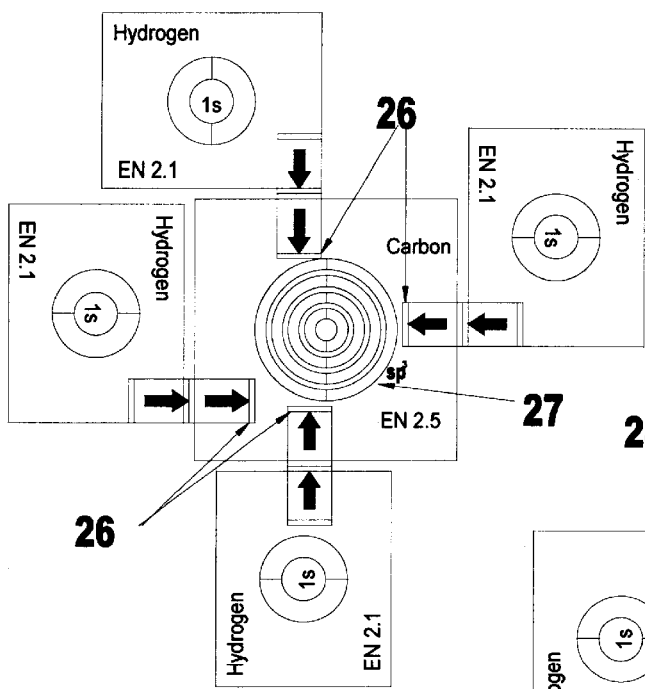
FIG. 7. Shows the Models as used in a Methane Molecule.
Figure 8:
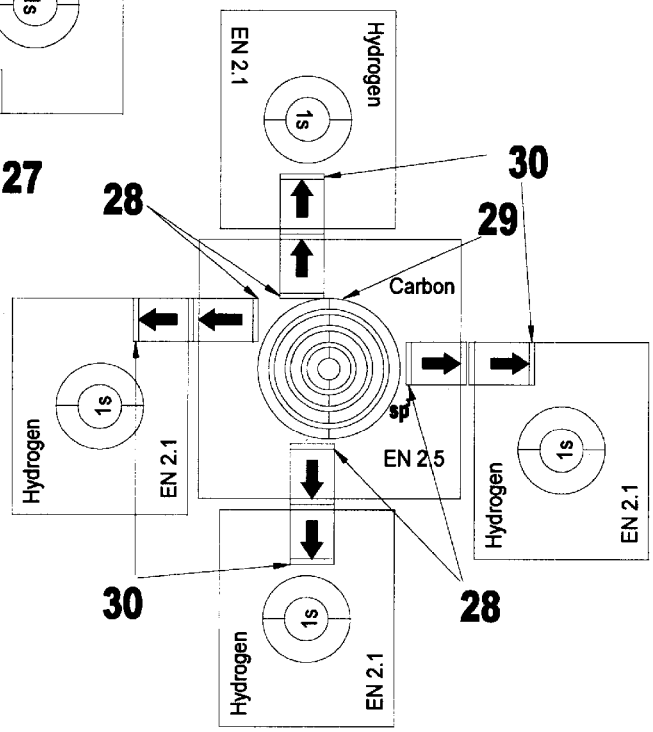
FIG. 8. Shows the Models as used in an excited Methane Molecule ready to react.
Figure 9:
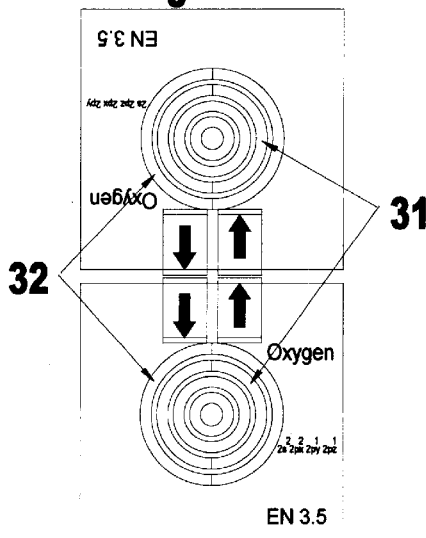
FIG. 9. Shows the Models as used in a reactant Oxygen molecule.
Figure 10:
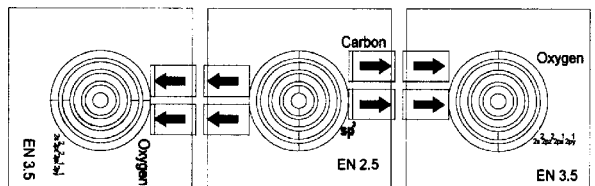
FIG. 10. Shows the Models as used in a Carbon Dioxide product.

This patent description represents a new type of modeling device that has no predecessor that acts in a similar manner. The chief new advantage that this modeling device incorporates is through the alignment of polarities in a magnet in order to mimic, abstractly, the spin magnetic moment of electrons. FIG. 1. drawing is of a Valence Electron Piece assembly and its chief purpose in the model will be to act as a valence electron with other manifestly incorporated educational meanings, and also as an attaching mechanism to build molecules. A ceramic magnet, 1, is attached by adhesive to the Valence Electron Piece assembly platform, 2. The Valence Electron Piece assembly also incorporates a cylindrical stem, 3, which allow the Valence Electron Piece assembly to freely rotate in the slot of the models base. The compressible wedge, 4, retains the Valence Electron Piece assembly in the models. All the Valence Electron Piece assemblies are the same design for each of the models. The direction of polarity will be assigned lengthwise through the magnet in the direction of the arrow, 5. FIG. 2. Shows one side of the attaching surface, 6, of the Valence Electron Piece ceramic magnet, the opposite edge representing the other attaching surface. Due to alignment of polarity, the side shown in 6 will only be able to mate its opposite side in the attachment mode of the model Valence Electron Piece assemblies, thus aligning the magnets in the same polarity direction. A compressible wedge for installing and removing Valence Electron Piece assembly from model base slots is seen in 7. FIG. 3. is a drawing of the Valence Electron Piece in a cutaway view of its operation within the model bases, where 8 represents a partial view of the base. The Valence Electron Piece, 9, is shown in the base slot, 10, allowing lateral movement around the base, which is hollow underneath. The stem of the Valence Electron Piece assembly, 11, is shown in the slot and is able to freely rotate in within the base. The magnet has an illustrated arrow, 12, which is drawn on top of the ceramic magnet in the direction of the polarity of the magnet, to be used in conjunction with the polarity of the magnet to indicate reduction-oxidation tendencies, as well as spin magnetic moment of individual electrons in a bond within a molecular species. Additionally, an illustrated blue stripe at the tip of the arrow, 13, and the red stripe at the base of the arrow, 14, will help define electron density moving away from or toward the nucleus when used with other illustrations on the models. The Valence Electron Piece assembly is held securely in the base with the compressible wedge, 15. FIG. 4. is a view of the general dimensions of the Hydrogen Model and represents the height, but not all dimensions of all the models. The illustrations printed on the surface will be used to build specific molecules and to make general assumptions about the individual element models and the molecules that they build. A Chemical symbol, 16, is largely illustrated on each model. An electron orbital configuration, 17, is illustrated by a circle for each orbital in the valence shell and is illustrated as being a full orbital by a blue circle, an empty orbital by a red circle and, as illustrated in FIG. 4., No. 17, a half-filled orbital of half red and half blue colors. The quantum nomenclature of the orbital illustrations, 18, will be displayed near the electron orbital configurations. The Pauling Electro-negativities, 19, for each of the elements in the Models is illustrated. The valence electron piece, 20, is shown in the slot, 21, with the tolerances of the base and magnet assembly allowing the edge of the magnet assembly to slightly overhang the edge of the base. The slot in the Hydrogen Model base, 21, also allows that the valence electron piece can mate with other models at three of its four sides for ease of manipulation and attachment to other models. FIG. 5. Shows a dimensional view of the Carbon Model (without illustrations) to demonstrate the placement of valence electron pieces, 22, in the Carbon base slots, 23. These slots, 23, are designed to allow the various bonding schemes applicable to each model within the set. With the Carbon model in FIG. 5., it is shown to facilitate all four sides of the model to accommodate two valence electron assemblies for double bonds on each side, and two sides which can accommodate three valence electron assemblies for facilitating triple bonds, as well as the other two bond schemes of Carbon, the two single bonds and a double bond on three sides, and four single bonds on each side. The models can build an unlimited number of types of molecules such as that of the Iso-Octane molecule as shown in FIG. 6. The molecule here boldly shows the effective combustive power of gasoline through depiction of a transition state with all the exterior Hydrogens in a reduced state, by virtue of the spin alignment of the bonded magnets pointing out towards the 1s orbital in 17 of the 18 Hydrogens within the molecule. This electronic orbital transition state can be carried through the model by the two reduced Carbons, 24, within the molecule being in a [Ne] noble configuration, with all eight valence electrons facing in. The other Carbons, perhaps as influenced by coulombic forces, allow all of their electrons to go to a higher "spin-up", if only at a quickly passing transition state, and therefore can achieve their oxidized Noble Configuration [He], and thus allow the 17 Hydrogens to be in a highly reactive and combustive, reduced state, even though Carbon has a slightly higher electro-negativity. The reverse can also be deducted if the two reduced Carbons, 24, were in an Oxidized State with all their valence electrons pointing out, which would be the more natural state with all the electronegative carbons that are surrounding them, it would produce an Iso-Octane molecule that had 17 of its 18 Hydrogen in a highly stable oxidized state, with their valence electrons pointing away from the nucleus. These two states of iso-Octane are both rational being that the Earth has produced trillions of barrels of this molecule and we have burned almost as much in cars. FIG. 7. represents a Methane molecule with its Carbon atom surrounded by its four Hydrogen in their reducing state with attached "spin-up" valence electrons, and in an oxidizing state for the Carbon, with its valence electrons "spin-down". The four Blue stripes of its valence electron magnet assemblies, 26, facing the Carbon's Orbital Configuration illustration, 27, simulating the filling up of its four red-half, unfilled sides of the concentric circles, to visually represent reduction to Noble [Ne] electron orbital configuration. In FIG. 8., the Methane Carbon in the figure has had the valence electrons reversed in polarity direction through manual manipulation of the direction of the arrows of the valence electron pieces to portray a highly oxidized Carbon with the four Hydrogen reduced. The four red stripes, 28, now being at the Carbon's Orbital illustration of four half red, half blue $2sp^3$ circles, 29, visually demonstrating its [He] noble configuration through simulated oxidation of the blue-half of electron orbital configurations. Also, the four Hydrogen have blue stripes, 30, at their $1s^1$ half-filled red and blue circle, electron orbital configuration, thus demonstrating its reduced orbital shell Noble [He] Configuration. FIG. 9. gives the most reasonable state of an Electronic Orbital Configuration of an Oxygen Molecule. With the same electro-negativity, they each reduce and oxidize one of their degenerate 2p-orbitals, 31, leaving a 2p-orbital unoccupied, 32, for the reduced Hydrogen in FIG. 8. to react with them. When two of the Oxygen modeled molecules do simulate a reaction to a Methane model, a Carbon Dioxide model can be produced, FIG. 10, as well as two Water Molecules (not illustrated), which demonstrates these models competence in effectively demonstrating reactions.

Not illustrated, but important to mention, is the fact that the Carbon Models may just have one pair, out of the four pairs of electrons, facing in, as in a long alkane, which could symbolically reduce one of the orbital illustrations (2s character) in its valence orbital illustrations and the other three be oxidized out (facing away from) the Carbon, or its inverse, one electron oxidized and three reducing the Carbon Model or a diamond allotrope of two valence electrons out and two valence electrons in the Carbon Model. And all the models can be assumed to act likewise and all the model bases have the above ideas incorporated with the same design considerations.

Lithium models have a slot that is molded along side one and side two. The slot extends far enough to the edges of side three and side four to allow the valence electron piece to bond on any of the four sides. The dimensions of this model and the others in the second period are larger than the Hydrogen model by 50%, indicating that they are a larger radius species. The chemical symbol, Li, is illustrated on the model base as is its $2s^1$ electronic orbital configuration by the use of a half-filled orbital of a red and blue circle with an additional 2p degenerate orbital shell. The Lithium is allowed to form into covalent or ionic bonds, which can be indicated by the direction of the arrows on the valence magnet, and where it is necessary the magnet can be removed to demonstrate its noble, ionic state.

The Beryllium model has the exact base as the Lithium. It has two valence electron pieces that are allowed to either enter into two covalent or ionic bonds, depending on arrow direction of the valence magnet arrow, on side one and side two, with two other models, or into a double bond on side one or side two with one other model. Its markings will show it to have two red and blue half-filled shells of $sp^1$ hybridization and two red empty sp hybridized shells. Its chemical symbol, Be, and electro-negativity is illustrated.

The Boron model has three separate slots molded on side one, side two and side three. The three valence electron pieces are used in the three different slots, with one slot reaching three sides and represent the sp hybridized state most normally encountered with its structures represented by three half-filled red and blue shells and one empty red shell. The valence electron pieces can rotate in an inward or outward direction for the oxidative or reductive reasons previously noted. The model can accommodate three covalent or ionic bonds, again depending on the direction of the arrows, as well as one double and a single bond, and bond with two or three other models with enough space to allow for large ligands that are not normally sterically restricted in this species.

The Carbon Model has two long slots that extend around to the different sides of the models, as previously described in drawing 5. These slots are shaped thus to accommodate the various bond patterns that the carbon is capable to do. The carbon allows the following construction of species: two double bonded models, one double and two single bonded models, a triple bonded and a single bonded model, and four single bonded models. It will have orbital assignment markings of four half-filled red and blue shells, in a $sp^3$ hybridized state and the Pauling Electro-negativity.

The arrows on the valence electron pieces will demonstrate the flow of electron density towards or away from a particular molecular structure, depending on its relative electro-negativity. Through the use of assigned electro-negativities, useful deductions about the mechanistic paths involved in reactions can be made. These may simulate a change in hybridization state to allow for one or two p-nodes that could thereby react with other molecular structures.

The Nitrogen has a model capable of triple, double and three single bonds, via the valence electron pieces as from a similar construction previously described. The markings will illustrate one filled s-shell and three half-filled p-shells of a 2p$^3$ electronic configuration, its name and Pauling Electro-negativity. The direction on the valence electron piece arrow will indicate relative oxidative or reductive tendencies of the species involved. In example, Nitric Acid is explained by the Nitrogen in an oxidative state (valence electron piece arrows pointing away) and the symbolic s shell, since its not represented by valence electron pieces, can be symbolically given up to an oxygen, to reach its noble configuration. Ammonia will be in its reducing state with all arrows pointing towards the nucleus.

The Oxygen model, has a single slot to cover two different sides of the model and two valence electron pieces, that can form two single or one double bond with the other models. The markings will indicate one filled 2s-shell, one filled 2p degenerate orbital and two half-filled 2p degenerate orbital configuration. The valence electron piece arrows will again be used to show the oxidative nature of oxygen. In example of its use. the pH of water can be demonstrated when a Hydrogen can occasionally reduce Oxygen, symbolized by the arrows going towards one of the Hydrogen and away from the Oxygen, thereby allowing the other Hydrogen to leave its electrons and protonize, again symbolically, by its facing arrow valence electrons filling Oxygen's unpaired p-shells, left open by the reducing Hydrogen pulling away an electron into its 1s shell. Here is illustrated that equilibrium of products can be demonstrated by the models by assuming an oxidative state that it may not normally have with the species it is joined to, but will occasionally achieve when a species is reductive.

The Fluorine model has a slot for bonding on side one. A single valence electron piece is used to form ionic bonds. The markings will show a filled 2s-shell and two filled 2p-shells and a half-filled 2p-shell. The direction of the valence magnet arrow will face in, in most structures, to indicate the electronegative strength of the fluorine.

The Sodium model and the Magnesium model are built with the same design considerations as the Lithium and Berylium models, with their individual chemical symbols illustrated on them respectively, and a 50% larger construction for the third period elements.

The Aluminum model has three valence electron pieces, the Silicon has four valence electron pieces, and the Phosphorous has five valence electron pieces. Excepting Aluminum, their decreased electro-negativity and increased radius prevents them from usually engaging in multiple bonds, so, a restriction of its bonding valence electrons to a single side when making its bonds in molecular structures is made, but otherwise will work in the same manner. Additionally, the Phosphorous will now have a pair of valence magnets on side three for hyper-valent bonding or in forming a double bond, where the other pnicogen, Nitrogen, just had the symbolic markings of the paired electrons. A 3d-orbital shell, marked by an orange 3d-orbital, for spd hybridized electronic states, are added to the third period Elements, 3$^{rd}$ row thru 7$^{th}$ row, on their markings to demonstrate the placement of the electrons in hyper-valent models. The Sulfur model has two sets of paired electrons on two of its sides, and two other sides can accommodate either a double or two single bonds with the two remaining valence electron pieces. The size of the model is increased from period 2 models to accommodate the extra models about the model's sides, in example SF$_6$ will be able to be sterically possible by aligning magnets at their widest points around the model base. Another modeled molecule, Sulfur Hydride, SH$_2$, will allow paired electrons to stay together unattached to other models, to demonstrate the several oxidative states of Sulfur and the same applies to other elements with multiple oxidation states.

The Chlorine model has side two, side three and side four with a slot which hold a pair of valence electron pieces each and side one slot to accommodate its unpaired electron. The Transition Metal will resemble the chlorine block and have valence electron pieces that can be interchanged depending on the oxidative state of the metal in question, and, perhaps, with a crystal field illustrated on its surface. Or, the Transition Metal Model could have Octahedral shapes for the models, which could simulate octahedrally coordinated Transition Metals, or other polyhedral shapes to accommodate f-orbital illustrations, which have 14 Valence electrons.

I claim:

1. A Molecular Modeling device that is comprised of; Individual Atomic Element Models of elements from the Periodic Table of the Elements with indicia on at least one surface of designed illustrations of the individual model Element's orbital configurations and nomenclature of the individual model Element's properties and with slots cut into the models surface which do retain a plurality of detachable Model Valence Electron Pieces; a plurality of Model Valence Electron Pieces, wherein each Model Valence Electron Piece. represents the valence electron of atoms, that can be retained into the slots of the Atomic Element Models and can freely rotate about the surface and move laterally in the slots of the Atomic Element Models, and have indicia on the surface of them indicating a moment of direction, and, when in the slots of the Atomic Elemental Models, each Model Valence Electron Piece, for a Model Valence Electron Piece to attach to and bond with another Model Valence Electron Piece in the slots of an opposing Atomic Element Model in a mutually identical moment of direction, so that, when one Piece is attached to another Piece, their indicia of moment of direction will either both face in towards the center of the Atomic Elemental Model or both face away from the center of the Atomic Element Model towards the center of the opposing Atomic Element Model, depending upon alignment of the moments of direction, and be able to be reversible in their mutual direction without the Model Valence Electron Pieces being detached from their respective Atomic Element Models.

2. The molecular modeling device of claim 1, wherein the device that can be used to make Molecular Models which have the following functional components of: Atomic Element Models that can attach to each other with Model Molecular Bonds, where each Model Molecular Bond consists of two Model Valence Electron Pieces, each attached to a separate Atomic Element Model; and, Model Molecular Bonds between any two Atomic Element Models which have indicia indicating a moment of direction between the Atomic Element Models that is dependent upon the moment of direction of the two Model Valence Electron Pieces.

3. The molecular modeling device of claim 2, wherein the device that can show, through the indicia of the moment of direction on the two Model Valence Electron Pieces in the Model Molecular Bond, a Model Molecular Bond Polarity, which, having a certain discernible polarity by one of the Model Valence Electron Pieces moment of direction facing away from the Atomic Element Model it is attached to, which represents one pole, and the other Model Valence Electron Piece in the Model Molecular Bond as having its moment of direction facing towards its Atomic Element Model that it is attached to, which represents the opposite pole, shall be reversible in polarity by a 180 degree rotation of the two Model Valence Electron Pieces without detachment of the Model Valence Electron Pieces from their respective Atomic Element Models.

4. The molecular modeling device of claim 1, wherein each Model Valence Electron Piece is comprised of: A ceramic magnet that has indicia, on at least one surface, of an arrow in a direction of polarity and indicia of at least two colored strips illustrated on opposing edges of the magnets polarity; and, a stem that is centered on and attached to the ceramic magnet; and, a retaining ball that fits into the slots of the Atomic Element Models and can be removed with applied pressure.

5. The molecular modeling device of claim 1, comprising Atomic Element Models which represent Hydrogen, Lithium, Beryllium, Boron, Carbon, Nitrogen, Oxygen, Fluorine, Sodium, Magnesium, Aluminum, Silicon, Phosphorous, Sulfur, Chlorine and a Transition metal, wherein each Atomic Element Model comprises the following indicia: for the Hydrogen, a half red, half blue circle, that has a $1s^1$ quantum nomenclature insignia; and, for the Lithium, a half blue and half red $2s^1$ orbital circle and three degenerate red, concentric 2p orbital circles; and, for the Beryllium, two concentric half red, half blue circles with $2s^1$ and $2px^1$ quantum nomenclature and 2 degenerate red, concentric 2pyz orbital configurations; and, for the Boron, three concentric half red, half blue circles with $2s^1$ and $2px^1$ and $2py^1$ quantum nomenclature and a red, 2pz circle orbital; and, for the Carbon, four concentric red half-circles, and four blue concentric half-circles with $2sp^3$ quantum nomenclature; and, for the Nitrogen, one blue $2s^2$ circle and three concentric half red, half blue circles with $2px^1$, $2py^1$ and $2pz^1$ quantum nomenclature; and, for the Oxygen, one blue $2s^2$ circle and one blue $2px^2$ circle and two concentric half red, half blue circles with $2py^1$ and $2pz^1$ quantum nomenclature; and, for the Fluorine, one blue $2s^2$ circle and two blue $2px^2$ and $2py^2$ circles and one half red, half blue circle with and $2pz^1$ quantum nomenclature; and, for the Sodium, a half blue and half red $3s^1$ orbital and three degenerate red, concentric 3p orbital configurations; and, for the Magnesium, two concentric half red, half blue circles with $3s^1$ and $3px^1$ quantum nomenclature and 2 degenerate red, concentric 3pyz orbital configurations; and, for the Aluminum, three concentric half red, half blue circles with $3s^1$ and $3px^1$ and $3py^1$ quantum nomenclature and a red, 2pz circle orbital and an orange circle of 3spd hybridization nomenclature; and, for the Silicon, four concentric half red, half blue circles with $3s^1$ and $3px^1$, $3py^1$ and $3pz^1$ quantum nomenclature and an orange circle of 3spd hybridization nomenclature; and, for the Phosphorous, one blue $3s^2$ circle and three concentric half red, half blue circles with $3px^1$, $3py^1$ and $3pz^1$ quantum nomenclature and an orange circle of 3spd hybridization nomenclature; and, for the Sulfur, one blue $3s^2$ circle and one blue $3px^2$ circle and two concentric half red, half blue circles with $3py^1$ and $3pz^1$ quantum nomenclature; and, for the Chlorine, one blue $3s^2$ circle and two blue $3px^2$ and $3py^2$ circles and one half red, half blue circle with and $3pz^1$ quantum nomenclature; and, for a Transition Metal, a Crystal Field with three lines above and two lines below will be illustrated without any quantum nomenclature.

\* \* \* \* \*